US012594931B2

(12) United States Patent
Jashari et al.

(10) Patent No.: US 12,594,931 B2
(45) Date of Patent: Apr. 7, 2026

(54) SMART CURB SENSOR SYSTEM

(71) Applicant: Valeo Schalter Und Sensoren GmbH,
Bietigheim-Bissingen (DE)

(72) Inventors: Besnik Jashari, Troy, MI (US); **Ahmad
Yame, Troy, MI (US); Abbas Haidar**,
Troy, MI (US)

(73) Assignee: Valeo Schalter und Sensoren GmbH,
Bietigheim-Bissingen (DE)

( * ) Notice: Subject to any disclaimer, the term of this
patent is extended or adjusted under 35
U.S.C. 154(b) by 43 days.

(21) Appl. No.: 18/590,193

(22) Filed: Feb. 28, 2024

(65) Prior Publication Data

US 2025/0269839 A1     Aug. 28, 2025

(51) Int. Cl.
B60W 30/06        (2006.01)
B60L 53/37        (2019.01)

(52) U.S. Cl.
CPC ............. B60W 30/06 (2013.01); B60L 53/37
(2019.02); B60W 2554/60 (2020.02)

(58) Field of Classification Search
CPC .... B60W 30/06; B60W 2554/60; B60L 53/37
See application file for complete search history.

(56) References Cited

U.S. PATENT DOCUMENTS

| | | | |
|---|---|---|---|
| 8,624,756 B2 | 1/2014 | Ganot | |
| 2004/0104814 A1* | 6/2004 | Christensen | ............ B60L 53/66 |
| | | | 340/426.16 |

FOREIGN PATENT DOCUMENTS

KR          102127738 B1 *  6/2020  ............. E04H 6/426

* cited by examiner

*Primary Examiner* — Daryl C Pope
(74) *Attorney, Agent, or Firm* — Valeo Schalter und
Sensoren GmbH

(57)          ABSTRACT

A sensor system for a vehicle low speed parking maneuver,
which includes a first curb with a groove, and a plurality of
proximity sensors contained within the groove, the plurality
of sensors to detect a vehicle tire within a determined
distance from the first curb during a vehicle parking maneu-
ver, and the plurality of sensors wirelessly transmit detection
data to a controller for parking validation.

17 Claims, 5 Drawing Sheets

SMART CURB SENSOR SYSTEM

TECHNICAL FIELD

The present disclosure relates to a smart curb sensor system to be utilized with a vehicle and a roadway.

BACKGROUND OF THE INVENTION

The invention relates to the field of detecting when a vehicle on a roadway is approaching a curb structure in distance. Currently, there is an issue of determining when a vehicle is nearing a curb structure on a roadway and detecting what the distance is between the vehicle and the curb structure, such as for example, during a parking maneuver or validation testing. In some embodiments, the smart curb sensor system houses a sensor system within at least one groove to detect when a vehicle is nearby, determine the distance between said vehicle and the smart curb sensor system, and transmit data to an external controller. The smart curb sensor system allows for an efficient and effective approach to detecting when a vehicle is close to a structure and determining that value distance.

SUMMARY OF THE INVENTION

A sensor system for a vehicle low speed parking maneuver. The sensor system includes a first curb with a groove. The sensor system further includes a plurality of proximity sensors contained within the groove. The sensor system additionally includes the plurality of sensors to detect a vehicle tire within a determined distance from the first curb during a vehicle parking maneuver. The sensor system moreover includes the plurality of sensors wirelessly transmit detection data to a controller for parking validation.

A sensor system for parking alignment to an Electric Vehicle (EV) charger. The sensor system includes a first curb with a first plurality of proximity sensors occupied within a first groove. The sensor system further includes a second curb with a second plurality of proximity sensors occupied within a second groove, the second curb is different from the first curb. The sensor system additionally includes the first plurality of sensors and the second plurality of sensors to detect a vehicle within a determined distance from the first curb and from the second curb during a vehicle parking alignment maneuver. The sensor system moreover includes the first plurality of sensors and the second plurality of sensors wirelessly transmit detection data to a controller for parking alignment validation.

A sensor system for a vehicle parking area. The sensor system includes a first curb with a first plurality of proximity sensors contained within a first groove. The sensor system further includes a second curb with a second plurality of proximity sensors contained within a second groove, the second curb is different from the first curb. The sensor system additionally includes the first plurality of sensors and the second plurality of sensors to detect if a vehicle is within a determined distance from the first curb and from the second curb located in a vehicle parking area. The sensor system moreover includes the first plurality of sensors and the second plurality of sensors wirelessly transmit detection data to a controller for parking validation.

The foregoing elements and features can be combined in various combinations without exclusivity, unless expressly indicated otherwise. These elements and features, as well as the operation thereof, will become more apparent in view of the following detailed description with accompanying drawings. It should be understood that the following detailed description and accompanying drawings are intended to be exemplary in nature and non-limiting.

BRIEF DESCRIPTION OF DRAWINGS

The embodiments of the present disclosure are pointed out with particularity in the appended claims. Various other features will become more apparent to those skilled in the art from the following detailed description of the disclosed non-limiting embodiments and will be best understood by referring to the following detailed description along with the accompanying drawings in which:

DETAILED DESCRIPTION OF THE INVENTION

Figure 1:
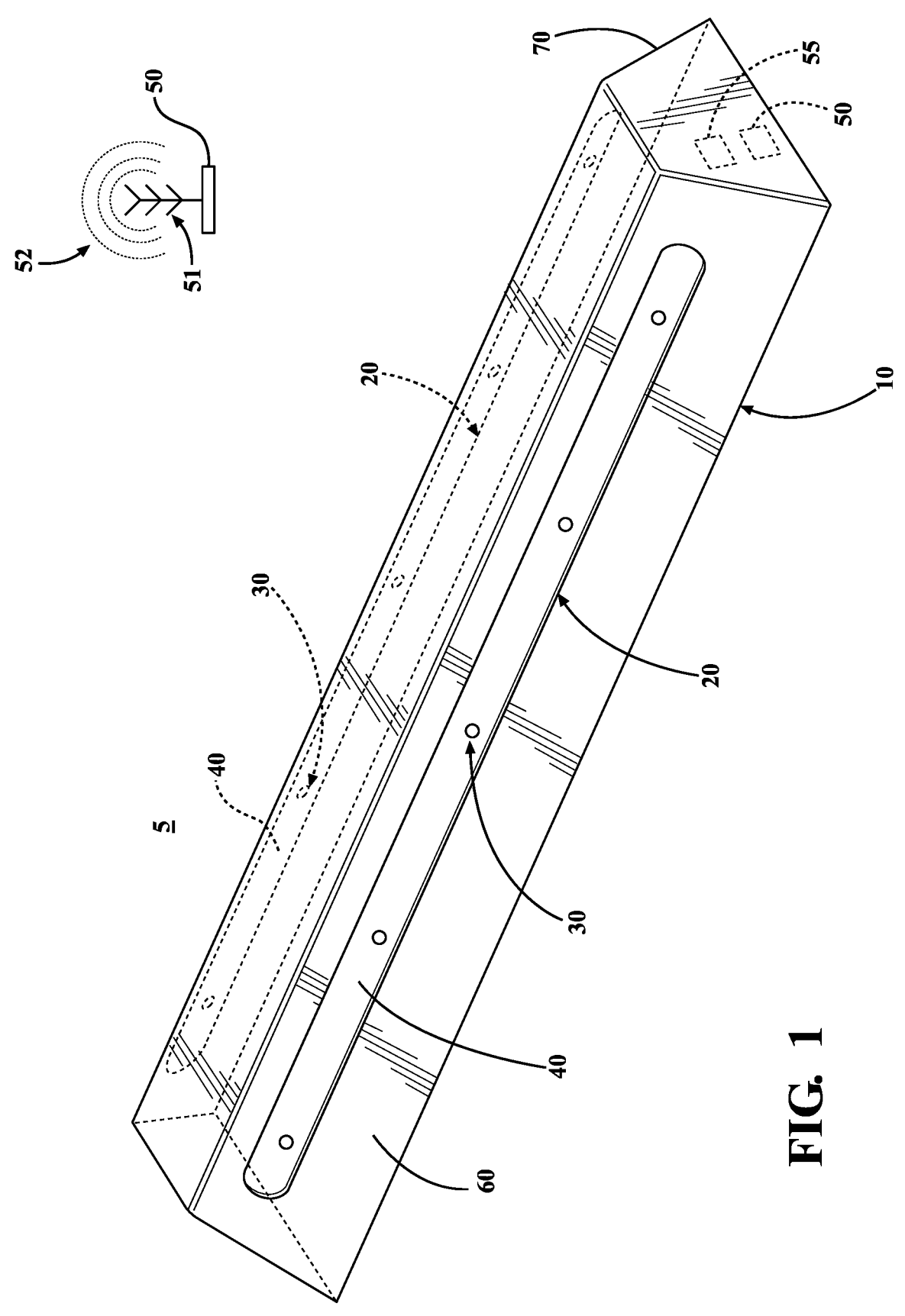
FIG. 1 illustrates a smart curb sensor system in accordance with one or more embodiments of the present disclosure.

Detailed embodiments of the present invention are disclosed herein. It is to be understood that the disclosed embodiments are merely examples of the invention that can be embodied in various and alternative forms. The Figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features described and illustrated with reference to any one of the Figures can be combined with features illustrated in one or more other Figures to produce embodiments that are not explicitly described or illustrated. The combinations of features illustrated provide representative embodiments for typical applications. However, various modifications and combinations of the features consistent with the teachings of this disclosure can be desired for particular applications or implementations.

"A", "an", and "the" as used herein refers to both singular and plural referents unless the context clearly dictates otherwise. By way of example, "a sensor" refers to one sensor or more than one sensor.

Currently, there is an issue relating to vehicle testing validation efficiency & automation of process with regard to no human direct interaction needed to measure outside the vehicle, thus increasing safety for slow speed automated driving maneuvers, such as parking, via curb transmit detections. Currently, vehicle validation testing is done by a human manually using a tape measure, for example. Presently, it is common to have the sensor system located on each vehicle to detect interaction with a curb structure during a parking maneuver. Thus, there is a need for a smart curb sensor system, which includes, for example, a plurality of proximity sensors located within a curb structure for validation testing and parking detection.

For example, when it comes to validation testing, a smart curb sensor system can fulfill the need to automatically and autonomously collect data to validate the end user performance compared to requirements, thus providing automation vehicle level testing. In one embodiment, the smart curb sensor system utilized to determine if a vehicle has conducted a parallel parking maneuver at a proper distance away from a side curb, or at a proper distance away from a front curb, or at a proper distance away from both a side curb and a front curb. In another embodiment, the smart curb sensor system utilized to determine if a vehicle is aligned properly in relation to an Electric Vehicle (EV) charger, meaning the smart curb sensor system determines when the EV is within an appropriate horizontal distance from a wired EV charger located on a wall area, or the EV is aligned correctly directionally left/right and directly above a wireless EV charger located on a ground area. In yet another embodiment, the smart curb sensor system utilized to determine if a vehicle is located within a parking spot, wherein the smart curb sensor system would be employed within a parking lot to assist with individual parking spot status indications of current vehicle occupancy or non-occupancy. It should be noted that "distance" can be a horizontal distance or can be a vertical distance.

In one embodiment, the smart curb sensor system can employ a plurality of proximity sensors added in increments to the composite material of the smart curb sensor system. The plurality of proximity sensors can be in a daisy chain formation. The plurality of proximity sensors can be flashed built-in on the curb surface and waterproofed sealed. The plurality of proximity sensors can constantly monitor for an approaching vehicle tire and then transmit the vehicle tire detection via a data signal to a wireless connection. The smart curb sensor system can have a transmission device and a receiver device, where the detection data can be used to validate the vehicle performance and feature during vehicle validation testing. The smart curb sensor system is an improvement to a vehicle validation testing process with regard to testing timing and resource utilization.

In one embodiment, when it comes to vehicle parking maneuvers, a smart curb sensor system can fulfill the need to automatically and autonomously collect data to determine if a vehicle is located in a parking spot, if a vehicle is aligned properly within a parking spot, if a parking spot is vacant (eg: empty) or occupied (eg: non-vacant), or if a vehicle is within a certain distance of a smart curb sensor system. In another embodiment, with regard to vehicle validation testing, would be that a smart curb sensor system can provide vehicle end position data versus the customer requirements, therefore the exact positioning of the vehicle and its final angle is automatically extracted through smart curb sensor detection and is validated accordingly.

In another embodiment, the smart curb sensor system can have a groove on one face or multiple faces of the smart curb sensor system. With regard to a plurality of faces, each with a groove, the plurality of grooves can each house a respective plurality of proximity sensors. The plurality of sensors can detect the distance from the smart curb face to a tire of a vehicle. The plurality of sensors can be encased by a waterproof sealant within the respective groove of the respective face of the smart curb sensor system.

In yet another embodiment, when it comes to vehicle parking maneuvers, a smart curb sensor system can be employed for automated parallel parking, providing proper alignment data for electric vehicle (EV) parking with charging (eg: wireless or wired), or providing status updates and alerts for parking area occupancy and vacancy.

FIG. 1 depicts a smart curb sensor system 5 in accordance with one or more embodiments of the present disclosure. As seen in FIG. 1, in one embodiment, the smart curb sensor system 5 can include a first curb 10. The first curb 10 can be made up of composite material, or other relevant materials, such as, but not limited to, concrete, rubber, cement, synthetic, semi-synthetic, plastic, metal, alloy, semi-alloy, elastomer, and/or polymer. The first curb 10 can have a groove 20 on a first face 60. In another embodiment, the first curb 10 can have the groove 20 on the first face 60 and another groove 20 on a second face 70. In one embodiment, the groove 20 can have a plurality of sensors 30 located within. In one embodiment, the plurality of sensors 30 can be a camera, a lidar, a radar, an infrared, or an ultrasonic. In one embodiment, the plurality of sensors 30 can be in a daisy chain formation, sequence formation, row formation, or ring formation. In another embodiment, the first curb 10 can have the plurality of sensors 30 contained within groove 20 on the first face 60 and another plurality of sensors 30 contained within another groove 20 on the second face 70. Thus, the first curb 10 can have more than one groove 20 and a plurality of sensors 30, with the first face 60 having one groove 20 and one of the plurality of sensors 30, and the second face 70 having another groove 20 and another plurality of sensors 30, wherein the faces 60, 70 can be on opposite sides of the first curb 10. In another embodiment, the faces 60, 70 can be on adjacent sides of the first curb 10.

The groove 20, of first face 60, can have a sealant 40 encasing the plurality of sensors 30. The sealant 40 can be waterproof, water-resistant, water-repellant, weatherproof, impermeable, or impervious. In another embodiment, the first curb 10 can have the plurality of sensors 30 contained within groove 20 by the sealant 40 on the first face 60 and another plurality of sensors 30 contained within another groove 20 by the sealant 40 on the second face 70. The plurality of sensors 30 enclosed within the first curb 10 can be in wireless digital communication with a controller 50. The controller 50 can be integrated into the first curb 10, or the controller 50 can be separate and located away from the first curb 10.

The wireless digital communication between the plurality of sensors 30 and the controller 50 can include a modem, a network card, an infrared communication device, a wireless communication device, and/or a chipset (such as a Bluetooth device, an IEEE 802.11 device, an IEEE 802.16.4 device, a WiFi device, an LTE device, cellular communication facilities including 4G, 5G, etc.), and/or the like. The wireless communication with controller 50 can permit data to be exchanged with a wireless communication network, wireless access points, other computing systems, etc. The communication can be carried out via one or more wireless communication antenna 51 that sends and/or receives wireless signals 52. In another embodiment, the digital communication between the plurality of sensors 30 and the controller 50 can be wired.

The plurality of sensors 30 provide data to the controller 50, which includes, but is not limited to, vehicle alignment in relation to the smart curb sensor system 5, vehicle alignment in relation to the first curb 10, vehicle alignment in relation to the first face 60, and/or vehicle alignment in relation to the second face 70. It should be understood that 'alignment' is the position or location of at least one of a vehicle, vehicle dumper, vehicle tire, vehicle engine, vehicle chassis, vehicle door (not shown) in relation to one or more of the smart curb sensor system 5, first curb 10, first face 60, and/or second face 70.

The plurality of sensors 30 provide data to the controller 50, which includes, but is not limited to, occupancy status of area in relation to the smart curb sensor system 5, occupancy status of area in relation to the first curb 10, occupancy status of area in relation to the first face 60, and/or occupancy status of area in relation to the second face 70. It should be understood that 'occupancy status of area' is, for example but not limited to, a vehicle (not shown) present, or not present, at an nearby position or location (eg: parking spot, parking area, validation testing area, electric vehicle charging parking area) in relation to one or more of the smart curb sensor system 5, first curb 10, first face 60, and/or second face 70.

Figure 2:
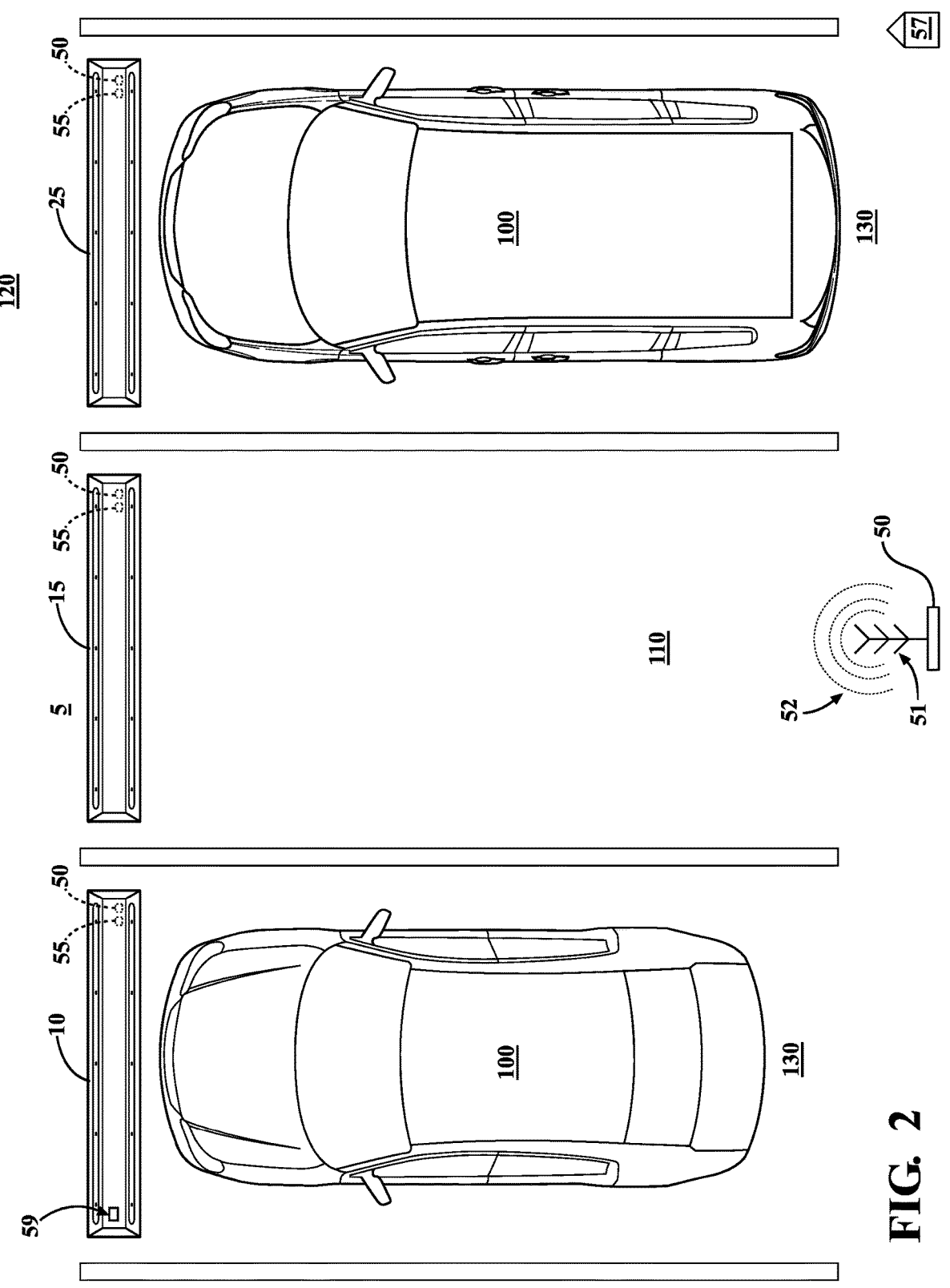
FIG. 2 illustrates a smart curb sensor system within a parking area in accordance with one or more embodiments of the present disclosure.

FIG. 2 depicts a smart curb sensor system 5 within a parking area in accordance with one or more embodiments of the present disclosure. As seen in FIG. 2, in one embodiment, the smart curb sensor system 5 can have the first curb 10, as well as a second curb 15, as well as a third curb 25. In one embodiment, the smart curb system 5 can include five first curbs 10. In another embodiment, the smart curb sensor system 5 can include four or seven or ten or fifteen or twenty or thirty or more curbs 10. The smart curb sensor system 5 can have a plurality of curbs 10, 15, 25 positioned throughout various locations of a parking area 120. At any time, in one embodiment, the parking area 120 can include a vehicle 100 (or multiple vehicles 100) positioned in an occupied parking spot 130 (or multiple occupied parking spots 130), as well as an empty parking spot 110 (or multiple empty parking spots 110). The plurality of sensors 30 within the first curb 10 will detect if the vehicle 100 is located nearby, thus providing data of an empty parking spot 110 or an occupied parking spot 130. The plurality of sensors 30 within the second curb 15 will detect if the vehicle 100 is located nearby, thus providing data of an empty parking spot 110 or an occupied parking spot 130. The plurality of sensors 30 within the third curb 25 will detect if the vehicle 100 is located nearby, thus providing data of an empty parking spot 110 or an occupied parking spot 130.

The plurality of sensors 30 will wirelessly transmit detection data to the controller 50, wherein the controller 50 is located at a different position from the plurality of sensors 30. The detection data being transmitted from the plurality of sensors 30 to the controller 50 consists of, but is not limited to, the status of the parking area 120, the positioning of vehicle 100, the positioning of vehicle 100 in relation to the first curb 10, the positioning of vehicle 100 in relation to the second curb 15, the positioning of vehicle 100 in relation to the third curb 25, the status of occupied parking spot 130, the status of empty parking spot 110, and the positioning of vehicle 100 within the occupied parking spot 130. From the collected detection data transmitted by the plurality of sensors 30, the controller 50 determines if the detection data is above or below a validation threshold. The validation threshold can be, but is not limited to, an occupancy status of a parking spot in the parking area 120, a positive parking maneuver performance during vehicle validation testing, and/or a proper parking alignment of a vehicle at an electric vehicle (EV) charging parking area. The controller 50 can transmit a notification to a vehicle user when the determined detection data is above the validation threshold. In another embodiment, within the vehicle, the notification is a visual message to the vehicle user, such as "parking is complete" or "nice parking job" or thumbs-up symbol or vacant parking spot or non-vacant parking spot; or the notification is visual alignment feedback to the user indicating vehicle movement to the left/right/forward/backward for proper parking position; or the notification is an audio response indicating parking alignment is incomplete, close-to-complete, complete with regard to the final destination (eg: beep noise, pattern beeping sounds). The notification is provided to the vehicle user via a Bluetooth-connected mobile device application (eg: phone app), vehicle display unit, vehicle sound system, visual illumination indicator, audio sound indicator, or any similar implementation.

A transmitter 55 for the smart curb sensor system 5 can send the detection data to the controller 50, the vehicle 100, a control station 57 for the parking area 120, and/or a combination of at least one of the respective curbs 10, 15, 25 or amongst each other. In one embodiment, each respective curb (eg: 10, 15, and/or 25) can have their own respective transmitter 55 to provide detection data to the controller 50, the vehicle 100, and/or a control station 57 for the parking area 120. In one embodiment, the smart curb sensor system 5 can have a primary curb (eg: 10) with secondary curb(s) (eg: 15 and/or 25) providing respective detection data to the primary curb, which in turn provides all detection data to controller 50, the vehicle 100, and/or a control station 57 for the parking area 120. The respective transmitter(s) 55 in the secondary curb(s) provide detection data to the primary curb, then the transmitter 55 of the primary curb provides all detection data to the controller 50, the vehicle 100, and/or a control station 57 for the parking area 120. Furthermore, the controller 50 can be integrated into the primary curb (eg: controller wired with curb), where all detection data from respective transmitters 55 of respective curbs 10, 15, 25 is provided, so the controller 50 can then transmit a notification to a vehicle user when the determined detection data is above the validation threshold.

The smart curb sensor system 5 with respective curbs 10, 15, 25 having respective plurality of sensors 30 and transmitters 55 can have a power source 59 (eg: battery, solar panel, wired or corded to tangible energy supply). The curbs 10, 15, 25 of the smart curb sensor system 5 can have a wireless connection (eg: Bluetooth between respective curbs) or can have a wired connection (eg: cords between respective curbs). Furthermore, transmitter 55 detection data can be transmitted via a wireless connection (eg: Bluetooth) or a wired connection (eg: cords) between respective curbs 10, 15, 25 and/or to the controller 50 and/or the control station 57.

Figure 3:
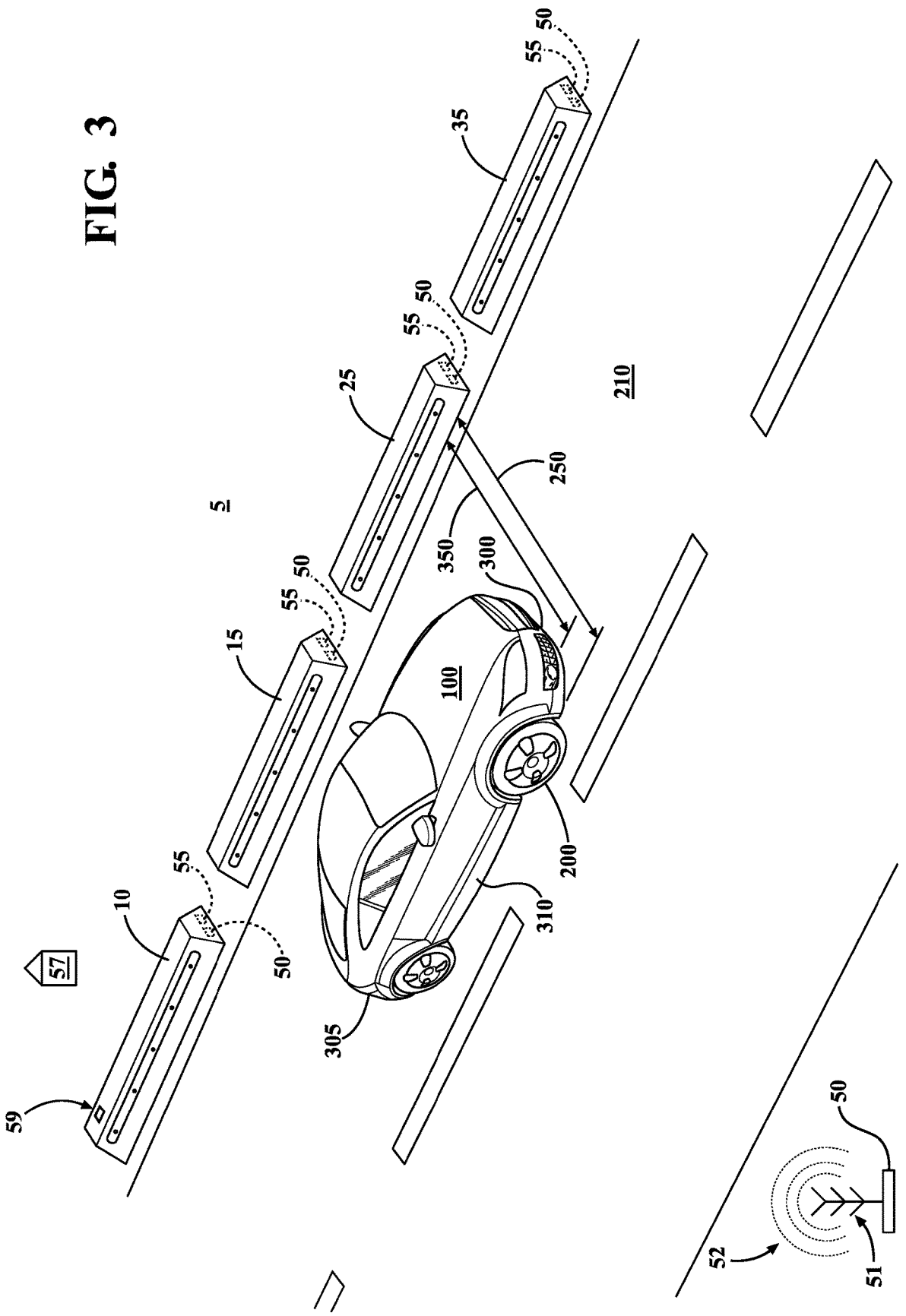
FIG. 3 illustrates a smart curb sensor system within a validation testing area in accordance with one or more embodiments of the present disclosure.

FIG. 3 depicts a smart curb sensor system 5 within a validation testing area in accordance with one or more embodiments of the present disclosure. As seen in FIG. 3, in one embodiment, the smart curb sensor system 5 can have the first curb 10, the second curb 15, the third curb 25, as well as a fourth curb 35. The smart curb sensor system 5 can be setup in a row along a roadway 210, meaning the first curb 10, the second curb 15, the third curb 25, and the fourth curb 35 are lined by next to each other in a single row parallel with the roadway 210. While the vehicle 100 is traveling along the roadway 210, the plurality of sensors 30 within the first curb 10, the second curb 15, the third curb 25, and/or the fourth curb 35 will detect the distance from the vehicle 100 to respective curb 10, 15, 25, 35. Additionally, while the vehicle 100 is performing a parking maneuver along the roadway 210, the plurality of sensors 30 within the first curb 10, the second curb 15, the third curb 25, and/or the fourth curb 35 will detect the distance from the vehicle 100 to respective curb 10, 15, 25, 35. In one embodiment, while the vehicle 100 is located on the roadway 210, the plurality of sensors 30 within the first curb 10, the second curb 15, the third curb 25, and/or the fourth curb 35 will detect the distance 250 from a vehicle tire 200 to respective curb 10, 15, 25, 35. In another embodiment, while the vehicle 100 is located on the roadway 210, the plurality of sensors 30 within the first curb 10, the second curb 15, the third curb 25, and/or the fourth curb 35 will detect the distance 350 from a vehicle front 300 to respective curb 10, 15, 25, 35. Each side driver/passenger door of the vehicle 100 has a respective vehicle side 310. The vehicle front 300 of the vehicle 100 can include a front bumper, fender area at the front near the vehicle engine compartment, headlamps, and front spoiler. The vehicle rear 305 can include a rear bumper, fender area at the rear near the vehicle trunk compartment, trunk lid, taillights, and rear spoiler. The vehicle side 310 can include a side bumper, fender area at the side of the vehicle, and side doors.

The plurality of sensors 30 will wirelessly transmit detection data to the controller 50, wherein the controller 50 is located at a different position from the plurality of sensors 30. The detection data being transmitted from the plurality of sensors 30 to the controller 50 consists of, but is not limited to, the distance (or length) from the respective curb 10, 15, 25, 35 to at least one of the vehicle 100, the vehicle tire 200, the vehicle front 300. From the collected detection data transmitted by the plurality of sensors 30, the controller 50 determines if the detection data is above or below a validation threshold. The validation threshold can be, but is not limited to, an occupancy status of a parking spot in the parking area 120, a positive parking maneuver performance during vehicle validation testing in the roadway 210, and/or a proper parking alignment of a vehicle at an electric vehicle (EV) charging parking area. Then, the controller 50 transmits, or outputs, a notification to a vehicle user when the determined detection data is above the validation threshold.

A transmitter 55 for the smart curb sensor system 5 can send the detection data to controller 50, the vehicle 100, a control station 57 for the parking area 120, a control station 57 for the roadway 210, and/or a combination of at least one of the respective curbs 10, 15, 25, 35 or amongst each other. In one embodiment, each respective curb (eg: 10, 15, 25, and/or 35) can have their own respective transmitter 55 to provide detection data to the controller 50, the vehicle 100, and/or a control station 57 for the parking area 120. In another embodiment, the smart curb sensor system 5 can have a primary curb (eg: 10) with secondary curb(s) (eg: 15 and/or 25 and/or 35) providing respective detection data to the primary curb, which in turn provides all detection data to controller 50, the vehicle 100, and/or a control station 57 for the parking area 120. The respective transmitter(s) 55 in the secondary curb(s) provide detection data to the primary curb, then the transmitter 55 of the primary curb provides all detection data to the controller 50, the vehicle 100, and/or a control station 57 for the parking area 120. Furthermore, the controller 50 can be integrated into the primary curb (eg: controller wired with curb), where all detection data from respective transmitters 55 of respective curbs 10, 15, 25, 35 is provided, so the controller 50 can then transmit a notification to a vehicle user when the determined detection data is above the validation threshold. The smart curb sensor system 5 with respective curbs 10, 15, 25, 35 having respective plurality of sensors 30 and transmitters 55 can have a power source 59 (eg: wired or corded to tangible energy supply, battery, solar panel). The curbs 10, 15, 25, 35 of the smart curb sensor system 5 can have a wireless connection (eg: Bluetooth between respective curbs) or can have a wired connection (eg: cords between respective curbs). Furthermore, transmitter 55 detection data can be transmitted via a wireless connection (eg: Bluetooth) or a wired connection (eg: cords) between respective curbs 10, 15, 25, 35 and/or to the controller 50 and/or the control station 57.

Figure 4:
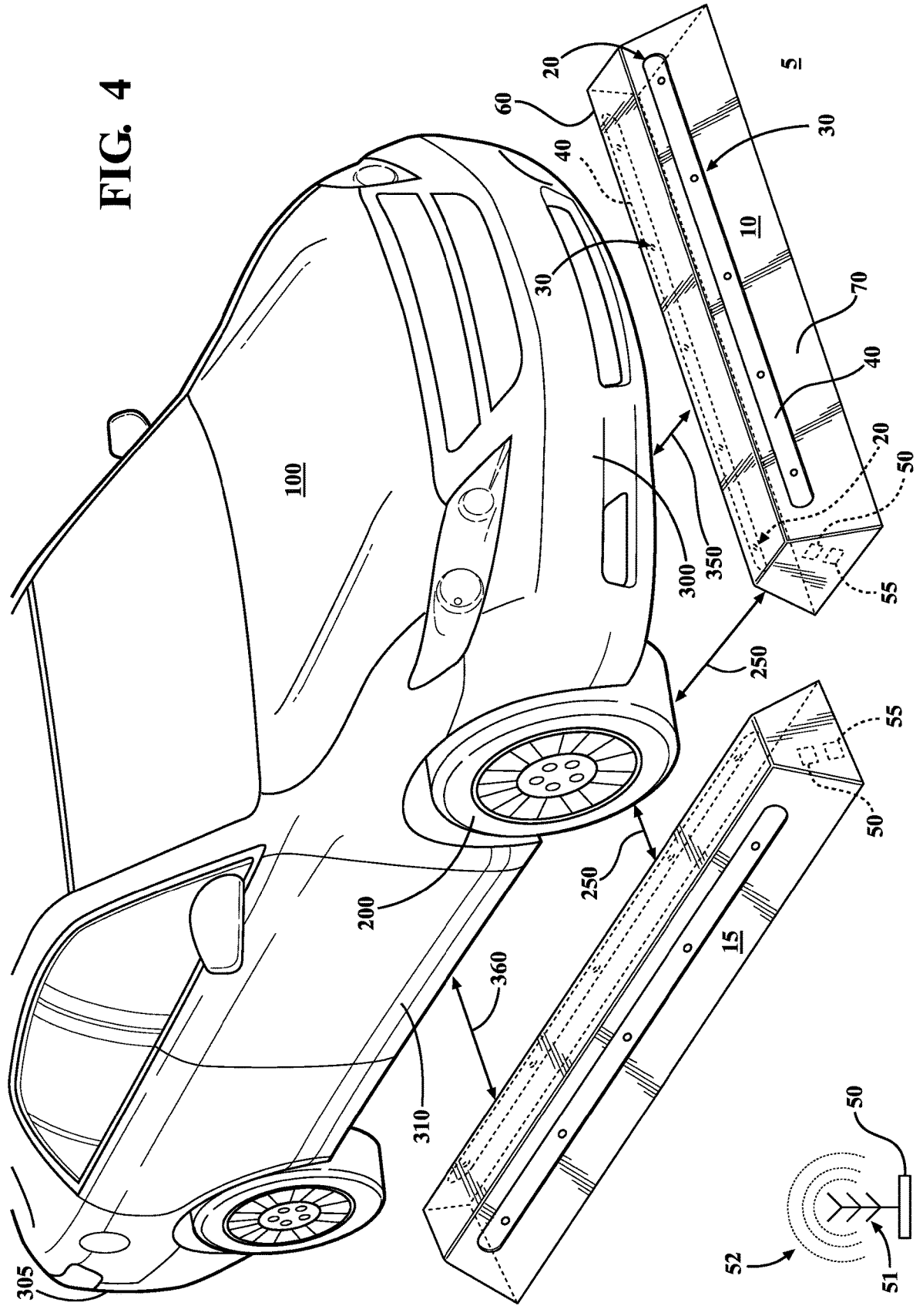
FIG. 4 illustrates a perspective view of a smart curb sensor system in relation to a vehicle in accordance with one or more embodiments of the present disclosure.

FIG. 4 depicts a perspective view of a smart curb sensor system 5 in relation to a vehicle in accordance with one or more embodiments of the present disclosure. When the vehicle 100, with the vehicle tire 200 and the vehicle front 300, engages in a parking maneuver at the parking area 120 or the roadway 210, the plurality of sensors 30 of smart curb sensor system 5 can detect the distance (or length) from the first curb 10 in-front to at least one of the vehicle 100, the vehicle tire 200, the vehicle front 300. In another embodiment, when the vehicle 100, with the vehicle tire 200 and the vehicle front 300, engages in a parking maneuver at the parking area 120 or the roadway 210, the plurality of sensors 30 of smart curb sensor system 5 can detect the distance (or length) from the second curb 15 on-the-side to at least one of the vehicle 100, the vehicle tire 200, the vehicle front 300. A variable combination of the respective curbs 10, 15, 25, 35 can be located along the parking area 120 or the roadway 210 to detect the distance (or length) from the respective curb 10, 15, 25, 35 to at least one of the vehicle 100, the vehicle tire 200, the vehicle front 300. In one embodiment, the plurality of sensors 30 within the first curb 10, the second curb 15, the third curb 25, and/or the fourth curb 35 will detect the distance 250 from a vehicle tire 200 to respective curb 10, 15, 25, 35 (eg: vehicle 100 in parking area 120, vehicle 100 in house garage). In another embodiment, the plurality of sensors 30 within the first curb 10, the second curb 15, the third curb 25, and/or the fourth curb 35 will detect the distance 350 from a vehicle front 300 to respective curb 10, 15, 25, 35 (eg: vehicle 110 in parking area 120, vehicle 100 in house garage). In yet another embodiment, the plurality of sensors 30 within the first curb 10, the second curb 15, the third curb 25, and/or the fourth curb 35 will detect the distance 360 from a vehicle side 310 to respective curb 10, 15, 25, 35 (eg: vehicle 110 in parking area 120, vehicle 100 in house garage). In yet another embodiment, the plurality of sensors 30 within the first curb 10, the second curb 15, the third curb 25, and/or the fourth curb 35 will detect a distance from a vehicle rear 305 to respective curb 10, 15, 25, 35 (eg: vehicle 110 in parking area 120, vehicle 100 in house garage).

Again, the plurality of sensors 30 will wirelessly transmit detection data to the controller 50, wherein the controller 50 is located at a different position from the plurality of sensors 30. The detection data being transmitted from the plurality of sensors 30 to the controller 50 consists of, but is not limited to, the distance (or length) from the respective curb 10, 15, 25, 35 to at least one of the vehicle 100, the vehicle tire 200, the vehicle front 300. From the collected detection data transmitted by the plurality of sensors 30, the controller 50 determines if the detection data is above or below a validation threshold. The validation threshold can be, but is not limited to, an occupancy status of a parking spot in the parking area 120, a positive parking maneuver performance during vehicle validation testing in the roadway 210, and/or a proper parking alignment of a vehicle at an electric vehicle (EV) charging parking area. Then, the controller 50 transmits, or outputs, a notification to a vehicle user when the determined detection data is above the validation threshold.

Figure 5:
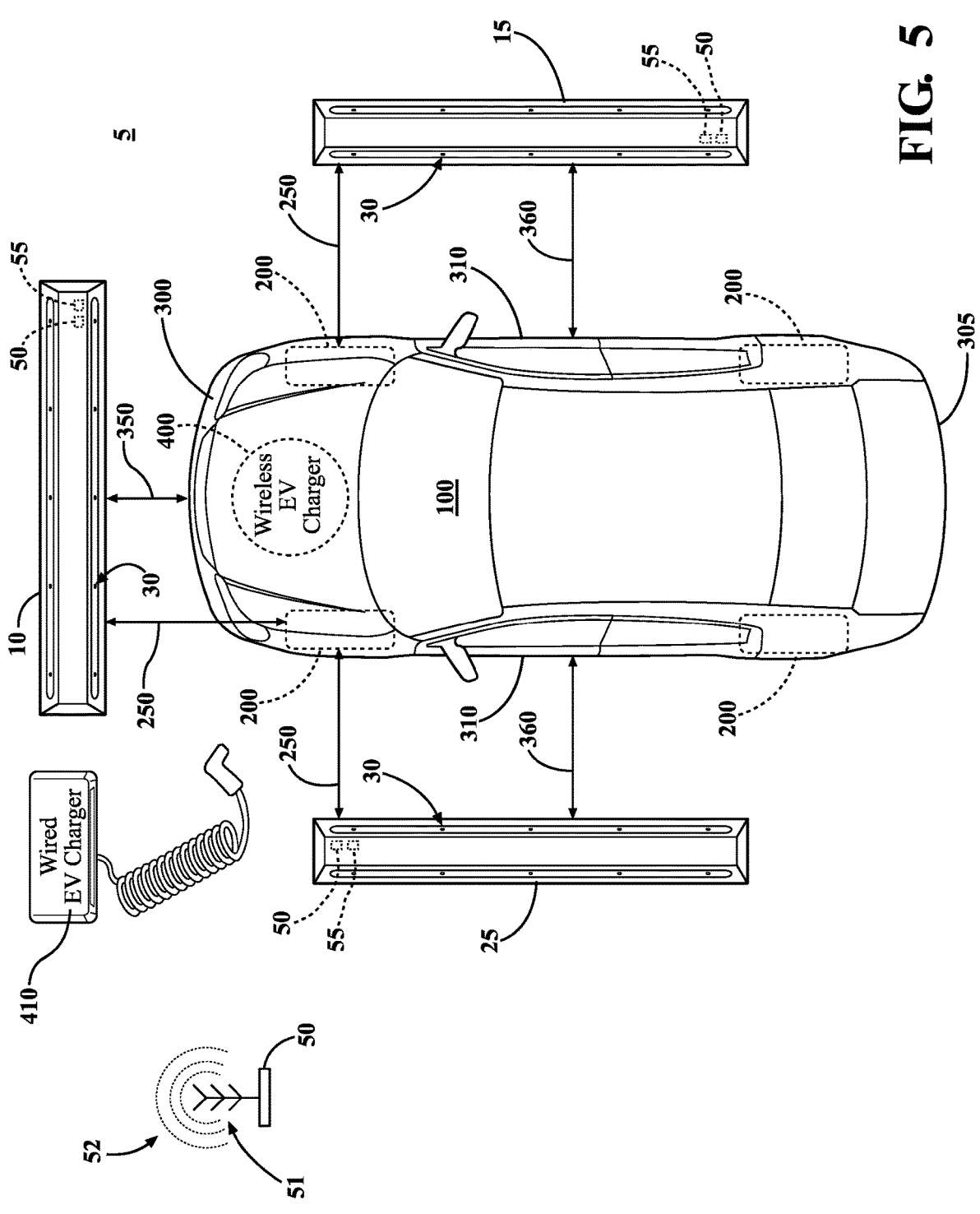
FIG. 5 illustrates a smart curb sensor system within an electric vehicle (EV) charging parking area in accordance with one or more embodiments of the present disclosure.

FIG. 5 depicts a smart curb sensor system 5 within an electric vehicle (EV) charging parking area in accordance with one or more embodiments of the present disclosure. As seen in FIG. 5, in one embodiment, the smart curb sensor system 5 can be arranged in relation to a wireless EV charger

400 located at a ground area and/or a wired EV charger 410 located on a wall area. The respective EV chargers 400, 410 can be powered by a solar panel(s), a battery(s), and/or a corded source. When the vehicle 100, with the vehicle tire 200 and the vehicle front 300, engages in a parking maneuver above the wireless EV charger 400 (eg: located on the ground, within the ground, below the ground), the plurality of sensors 30 of smart curb sensor system 5 can detect the distance (or length) from the first curb 10 in-front to at least one of the vehicle 100, the vehicle tire 200, the vehicle front 300. Furthermore, when the vehicle 100, with the vehicle tire 200 and the vehicle front 300, engages in a parking maneuver nearby the wired EV charger 410 (eg: wall-mounted, standalone, free-standing), the plurality of sensors 30 of smart curb sensor system 5 can detect the distance (or length) from the first curb 10 in-front to at least one of the vehicle 100, the vehicle tire 200, the vehicle front 300. It should be understood that the controller 50 is interconnected to the EV charger (eg: wireless EV charger 400 and/or the wired EV charger 410) and the respective plurality of sensors 30 and transmitters 55 of the respective curbs 10, 15, 25 of the smart curb sensor system 5 to create an all-in-one system for vehicle detection and alignment for a proper final outcome via providing notification data to the vehicle user. In one embodiment, the plurality of sensors 30 within the first curb 10, the second curb 15, the third curb 25, and/or the fourth curb 35 will detect the distance 250 from a vehicle tire 200 to respective curb 10, 15, 25, 35 (eg: vehicle 100 in parking area 120, vehicle 100 in house garage). In another embodiment, the plurality of sensors 30 within the first curb 10, the second curb 15, the third curb 25, and/or the fourth curb 35 will detect the distance 350 from a vehicle front 300 to respective curb 10, 15, 25, 35 (eg: vehicle 110 in parking area 120, vehicle 100 in house garage). In yet another embodiment, the plurality of sensors 30 within the first curb 10, the second curb 15, the third curb 25, and/or the fourth curb 35 will detect the distance 360 from a vehicle side 310 to respective curb 10, 15, 25, 35 (eg: vehicle 110 in parking area 120, vehicle 100 in house garage). In yet another embodiment, the plurality of sensors 30 within the first curb 10, the second curb 15, the third curb 25, and/or the fourth curb 35 will detect a distance from a vehicle rear 305 to respective curb 10, 15, 25, 35 (eg: vehicle 110 in parking area 120, vehicle 100 in house garage).

In one embodiment, when the vehicle 100, with the vehicle tire 200 and the vehicle front 300, engages in a parking maneuver above the wireless EV charger 400 located at a ground area, the plurality of sensors 30 of smart curb sensor system 5 can detect the distance (or length) from the second curb 15 and/or the third curb 25 on-the-side to at least one of the vehicle 100, the vehicle tire 200, the vehicle front 300. In another embodiment, the wireless EV charger 400 is located on top of the ground area, at ground level, or built into the ground. In yet another embodiment, when the vehicle 100, with the vehicle tire 200 and the vehicle front 300, engages in a parking maneuver nearby the wired EV charger 410 located on a wall area, the plurality of sensors 30 of smart curb sensor system 5 can detect the horizontal distance (or length) from the second curb 15 and/or the third curb 25 on-the-side to at least one of the vehicle 100, the vehicle tire 200, the vehicle front 300. A variable combination of the respective curbs 10, 15, 25, 35 can be located along the parking area 120 or the roadway 210 to detect the distance (or length) from the respective curb 10, 15, 25, 35 to at least one of the vehicle 100, the vehicle tire 200, the vehicle front 300. In yet another embodiment, when the vehicle 100 engages in a parking maneuver in relation to an EV charger (eg: wireless EV charger 400, wired EV charger 410), the respective plurality of sensors 30 of the front first curb 10, right-side second curb 15, and left-side third curb 25 provide detection data, via respective transmitters 55 and the controller 50, for the vehicle to move forward, or backward, or left, or right, or combination thereof, so there is proper alignment with the EV charger. The alignment feedback to the user indicates vehicle movement left, right, forward, backward, or a combination thereof in relation to a horizontal distance from a centerpoint of the wireless EV charger located on a ground beneath the vehicle in relationship to the vehicle's wireless charging pad. The alignment feedback to the user indicates vehicle movement left, right, forward, backward, or a combination thereof in relation to a horizontal distance from the wall-mounted wired EV charger. The vehicle is connected, or linked up, to the EV charger, therefore the vehicle knows where the EV charger is located in order to determine guidance directions accordingly in relation to each other via the smart curb sensor system 5. The vehicle knows the location of the vehicle charging pad and the location of the EV charger charging pad, therefore, via the smart curb sensor system 5, the vehicle knows which latitudinal and/or longitudinal direction(s) to travel in order to properly align the vehicle charging pad in relation to the EV charger charging pad. In another embodiment, the EV charger, with charging pad, knows the vehicle identification information and vehicle charging pad location, so the EV charger can guide the vehicle with charging pad to proper alignment with the EV charging pad.

The plurality of sensors 30 detect the distance (or length) from the first curb 10 (or respective curbs 10, 15, 25, 35 as aforementioned) to assist the vehicle 100 with proper alignment in relation to the wireless EV charger 400 located on a ground area and/or the wired EV charger 410 located on a wall area. From the collected detection data transmitted by the plurality of sensors 30, the controller 50 determines if the detection data is above or below a validation threshold. The validation threshold can be, but is not limited to, an occupancy status of a parking spot in the parking area 120, a positive parking maneuver performance during vehicle validation testing in the roadway 210, and/or a proper parking alignment of a vehicle at an electric vehicle (EV) charging parking area in relation to the wireless EV charger 400 located on a ground area and/or the wired EV charger 410 located on a wall area. Then, the controller 50 transmits, or outputs, a notification to a vehicle user when the determined detection data is above the validation threshold. This proper alignment for the vehicle 100 is provided by assistance from the smart curb sensor system 5, so effective and efficient EV charging can occur. In one embodiment, within the vehicle, the notification is a visual message to the vehicle user, such as "parking is complete" or "nice parking job" or thumbs-up symbol; or the notification is visual alignment feedback to the user indicating vehicle movement to the left/right/forward/backward for proper parking position and alignment with the EV charger; or the notification is an audio response indicating parking alignment is incomplete, close-to-complete, complete with regard to the final destination (eg: beep noise, pattern beeping sounds). The notification is provided to the vehicle user via a Bluetooth-connected mobile device application (eg: phone app), vehicle display unit, vehicle sound system, or any similar implementation. Via the detection data provided by the respective plurality of sensors 30 from the respective curbs 10, 15 and 25, the vehicle 100 can move left or right or forward or backward to become properly aligned with the EV charger (eg: wireless EV charger 400 located on a ground area and/or the wired EV charger 410 located on a wall area).

A transmitter 55 for the smart curb sensor system 5 can send the detection data to controller 50. In another embodiment, the transmitter 55 can send the detection data to the vehicle 100, the wireless EV charger 400, the wired EV charger 410, a control station 57 for the parking area 120, a control station 57 for the roadway 210, and/or a combination of at least one of the respective curbs 10, 15, 25, 35 or amongst each other.

The methods, processes, or algorithms disclosed herein can be deliverable to or implemented by a processing device, controller, or computer, which can include any existing programmable electronic control unit or dedicated electronic control unit. Also, the methods, processes, or algorithms can be implemented in a software executable object. Furthermore, the methods, processes, or algorithms can be stored as data and instructions executable by a controller or computer in many forms including, but not limited to, information permanently stored on non-writable storage media, such as ROM devices, and information alterably stored on writeable storage media, such as floppy disks, magnetic tapes, CDs, RAM devices, and other magnetic and optical media. Computing devices described herein generally include computer-executable instructions, where the instructions can be executable by one or more computing or hardware devices, such as those listed above. Such instructions and other data can be stored and transmitted using a variety of computer-readable media. Computer-executable instructions can be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Moreover, the methods, processes, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims of the invention. While the present disclosure is described with reference to the figures, it will be understood by those skilled in the art that various changes can be made and equivalents can be substituted without departing from the scope and spirit of the present disclosure. The words used in the specification are words of description rather than limitation, and it is further understood that various changes can be made without departing from the scope and spirit of the invention disclosure. In addition, various modifications can be applied to adapt the teachings of the present disclosure to particular situations, applications, and/or materials, without departing from the essential scope and spirit thereof. Additionally, the features of various embodiments can be combined to form further embodiments of the invention that cannot be explicitly described or illustrated. While various embodiments can have been described as providing advantages or being preferred over other embodiments or prior art implementations with respect to one or more desired characteristics, those of ordinary skill in the art recognize that one or more features or characteristics could be compromised to achieve desired overall system attributes, which depend on the specific application and implementation. These attributes can include, but not limited to, strength, cost, durability, life cycle cost, appearance, marketability, size, packaging, weight, serviceability, manufacturability, ease of assembly, etc. Therefore, to the extent any embodiments are described as less desirable than other embodiments or prior art implementations with respect to one or more characteristics, these embodiments are not outside the scope of the disclosure and can be desirable for particular applications. Thus, the present disclosure is thus not limited to the particular examples disclosed herein, but includes all embodiments falling within the scope of the appended claims.

The invention claimed is:

1. A sensor system for a vehicle low speed parking maneuver, comprising:
   a first curb with a groove; and
   a plurality of proximity sensors contained within the groove;
   the plurality of sensors to detect a vehicle tire within a determined distance from the first curb during a vehicle parking maneuver; and
   the plurality of sensors wirelessly transmit detection data to a controller for parking validation, wherein the controller determines if the detection data is above or below a validation threshold.

2. The sensor system of claim 1, wherein the plurality of proximity sensors are in a daisy chain formation.

3. The sensor system of claim 1, wherein the first curb is a composite material.

4. The sensor system of claim 1, wherein the groove with the plurality of sensors is encased by a waterproof sealant.

5. The sensor system of claim 1, wherein the groove is directed toward the vehicle tire.

6. The sensor system of claim 1, wherein the controller transmits a notification to a user when the determined detection data is above the validation threshold.

7. The sensor system of claim 1, wherein the first curb is located nearby a second curb, the second curb different from the first curb;
   wherein the second curb further comprising a second groove and a second plurality of proximity sensors.

8. A sensor system for parking alignment to an Electric Vehicle (EV) charger, comprising:
   a first curb with a first plurality of proximity sensors occupied within a first groove;
   a second curb with a second plurality of proximity sensors occupied within a second groove, the second curb is different from the first curb;
   the first plurality of sensors and the second plurality of sensors to detect a vehicle within a determined distance from the first curb and from the second curb during a vehicle parking alignment maneuver; and
   the first plurality of sensors and the second plurality of sensors wirelessly transmit detection data to a controller for parking alignment validation, wherein the controller determines if the detection data is above or below a validation threshold.

9. The sensor system of claim 8, wherein the controller transmits a notification to a user when the determined detection data is above the validation threshold.

10. The sensor system of claim 9, wherein the notification includes at least one of a visual message and an audio message.

11. The sensor system of claim 9, wherein the notification is alignment feedback to the user indicating vehicle movement in relation to a centerpoint of the EV charger located on a ground beneath the vehicle, wherein the alignment feedback provides indication to move the vehicle at least one of left, right, forward, backward in relation to a horizontal distance from the centerpoint of the EV charger.

12. The sensor system of claim 9, wherein the notification is alignment feedback to the user indicating vehicle movement in relation to the EV charger mounted on a wall located a horizontal distance from the vehicle, wherein the alignment feedback provides indication to move the vehicle at least one of left, right, forward, backward in relation to a horizontal distance from the wall-mounted EV charger.

13. A sensor system for a vehicle parking area, comprising:

a first curb with a first plurality of proximity sensors contained within a first groove;

a second curb with a second plurality of proximity sensors contained within a second groove, the second curb is different from the first curb;

the first plurality of sensors and the second plurality of sensors to detect if a vehicle is within a determined distance from the first curb and from the second curb located in a vehicle parking area; and the first plurality of sensors and the second plurality of sensors wirelessly transmit detection data to a controller for parking validation, wherein the controller determines if the detection data is above or below a validation threshold.

14. The sensor system of claim 13, wherein the controller transmits a notification to a user when the determined detection data is above the validation threshold.

15. The sensor system of claim 14, wherein the notification includes an occupancy status of a parking spot in the vehicle parking area, wherein the occupancy status is at least one of vacant and non-vacant.

16. The sensor system of claim 15, wherein the notification includes at least one of a visual illumination indicator and an audio sound indicator.

17. The sensor system of claim 13, wherein the first curb and the second curb are located nearby a third curb, the third curb different from the first curb and the second curb; wherein the third curb further comprising a third groove and a third plurality of proximity sensors.

\*   \*   \*   \*   \*